May 21, 1968     A. B. NEWTON     3,384,155
AIR CONDITIONING SYSTEM
Filed Jan. 24, 1966     3 Sheets-Sheet 1
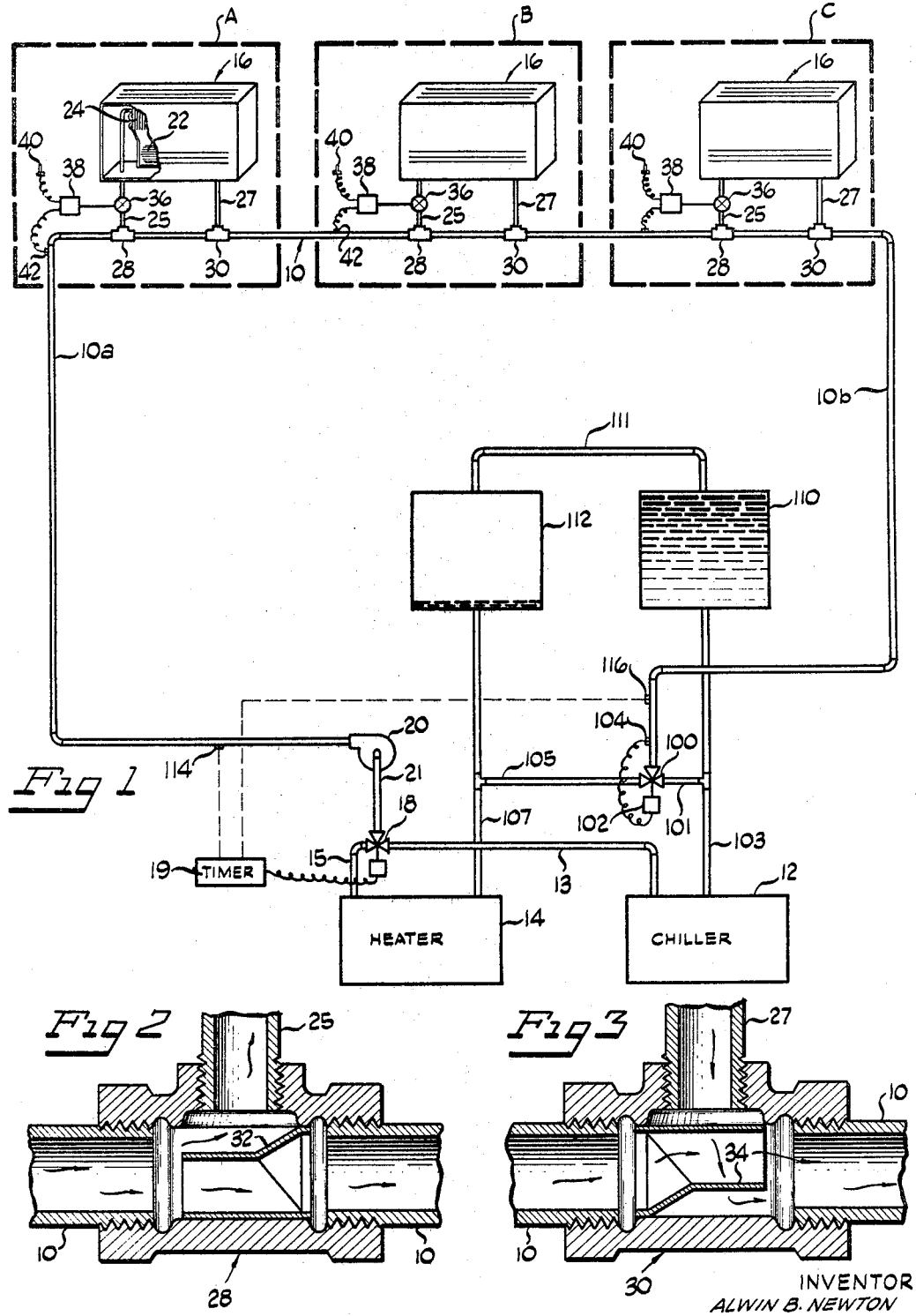
INVENTOR
ALWIN B. NEWTON
BY
ATTORNEY

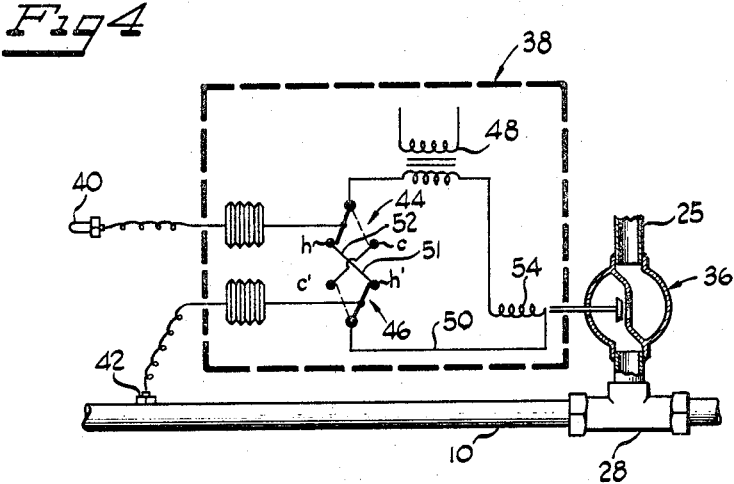
Fig 4
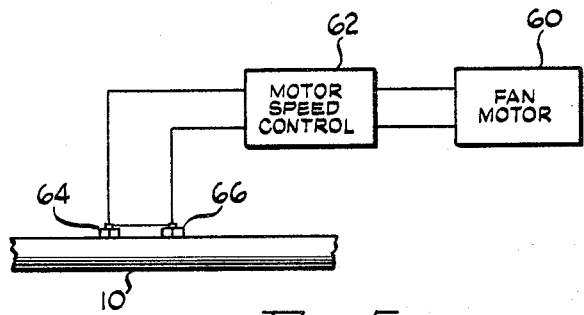
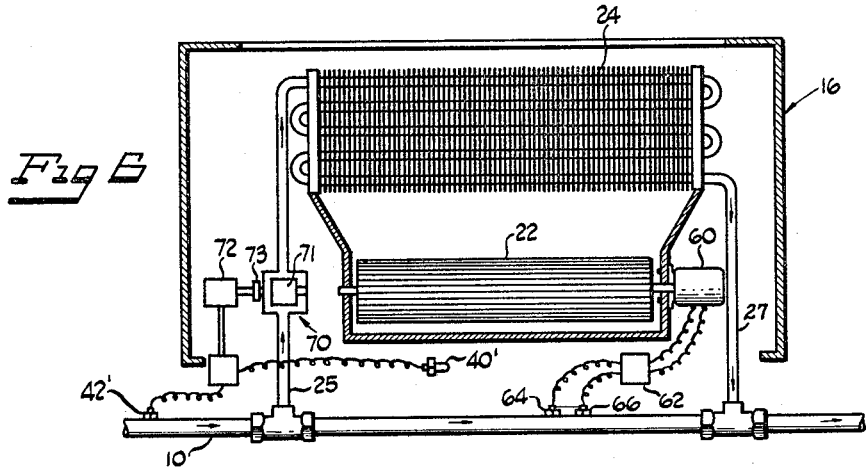
Fig 5
Fig 6

INVENTOR
ALWIN B. NEWTON
BY Thomas B. Hunter
ATTORNEY

United States Patent Office 3,384,155
Patented May 21, 1968

3,384,155
AIR CONDITIONING SYSTEM
Alwin B. Newton, York, Pa., assignor to Borg-Warner Corporation, a corporation of Illinois
Filed Jan. 24, 1966, Ser. No. 522,588
11 Claims. (Cl. 165—2)

ABSTRACT OF THE DISCLOSURE

An air conditioning system in which a heated and chilled liquid heat exchange medium is alternately made available to the heat exchange units in various zones. Temperature sensors associated with both the supply conduit and ambient air operate a control which permits the heat exchange medium to be supplied to the heat exchangers only when chilled medium is available and the zones require cooling, or when heated medium is available and the zones require heating.

---

This invention relates generally to air conditioning systems, and more particularly to a piping or water distribution system for a multi-room air conditioning installation.

Air conditioning systems used in multi-room buildings such as office buildings, high-rise apartments, hotels, and similar structures are optimally designed so that the temperature in each room (or at least a small group of rooms) can be independently controlled. Because of the relatively large solar heat gain in the outside rooms, a properly designed system is constructed so that both hot and cold water is made available to the individual room air conditioning units (induction or fan-coil) at all times, except when all rooms require heating (or cooling). However, even when the outside ambient air temperature is quite low—30° to 40° F.—the peripheral zones which are subjected to solar radiation may still require cooling, even though the zones on th shady sides require heating. The interior zones, where the thermal loads are due almost entirely to lighting, office equipment and people, may require cooling all year long.

The conventional piping or water distribution system for providing both hot and cold water (or some other heat exchange medium) to all of the room units is quite complex. In general, there are three basic systems in common use at the present time: the "four-pipe" system, the "three-pipe" system, and the "two-pipe" system. In the four-pipe system, the individual room units are supplied with hot and cold water from the heater and chiller respectively through separate conduits; and the water leaving the room units is returned to the heater and chiller through separate conduits. In the three-pipe system, the hot and cold water is supplied to each room unit through separate conduits, but is returned through a common line in which the returning water from all units is mixed en route to the heater and chiller, with a portion of such returning water being directed to the chiller and the remaining portion to the heater. The two-pipe system comprises one supply line and one return line connected to each room unit. The system is thus limited to circulating hot or cold water to all units in the system at any given period. Normally, hot water is circulated when most of the rooms require heating and cold water when most of the rooms require cooling. When intermediate conditions exist, accurate control is impossible.

In spite of the higher operating costs of the three-pipe system and certain pressure balancing problems associated with its operation, it has achieved significant commercial success because of its lower installation cost, attributed to the elimination of the extra return line. When it is realized that the water distribution system accounts for about 50% of the cost of the entire installation, which includes the heater, the chiller, the room units and controls, it is apparent that improvements which are directed to elimination of unnecessary piping can result in considerable savings.

The present invention can be characterized generally as an improved air conditioning system which uses a single conduit for distributing the water (or other heat exchange medium) to the individual room units and, therefore, can be regarded as a "single pipe" system. The single water supply (and return) line constitutes the major part of a complete closed circuit conduit system interconnecting all of the room units with the water heater and the water chiller. If conditions are such that heating is required by some rooms and cooling in others, hot and cold water are circulated through the systems alternately.

If the thermostatic control for a particular unit calls for heating, the water is withdrawn from the supply line to the room unit only when *hot* water is being circulated; otherwise, it is bypassed. If a room requires cooling, the water is withdrawn by the room unit only if *cold* water is being circulated; otherwise, it is bypassed. The cycling time, i.e. the ratio of the time cold water is circulated to the time that hot water is circulated; is varied in accordance with overall cooling and heating needs; and the cycling will occur often enough so that good temperature control can be maintained in all zones.

It is, therefore, a principal object of the invention to provide an improved air conditioning system having a single conduit to interconnect the water heater and chiller with the individual room conditioning units. Another object of the invention is to provide a low-cost air conditioning system in which the temperature in various zones can be individually controlled. Another object of the invention is to provide a system in which the heated or chilled water is alternately made available to the room air conditioning units during periods when some rooms require cooling and others require heating. Additional objects and advantages will be apparent from the following detailed description taken in conjunction with the drawings, wherein:

FIGURE 1 is a schematic illustration of a preferred embodiment of the invention;

FIGURE 2 is a cross-sectional view of the inlet connection for one of the room air conditioning units;

FIGURE 3 is a cross-sectional view of the outlet connection for one of the room air conditioning units;

FIGURE 4 is a schematic illustration of the temperature control system;

FIGURE 5 illustrates a temperature control system for a modified form of the invention;

FIGURE 6 is a cross-sectional view, partly schematic, of the water supply and return arrangement and control for a modified form of the invention;

Figure 7:
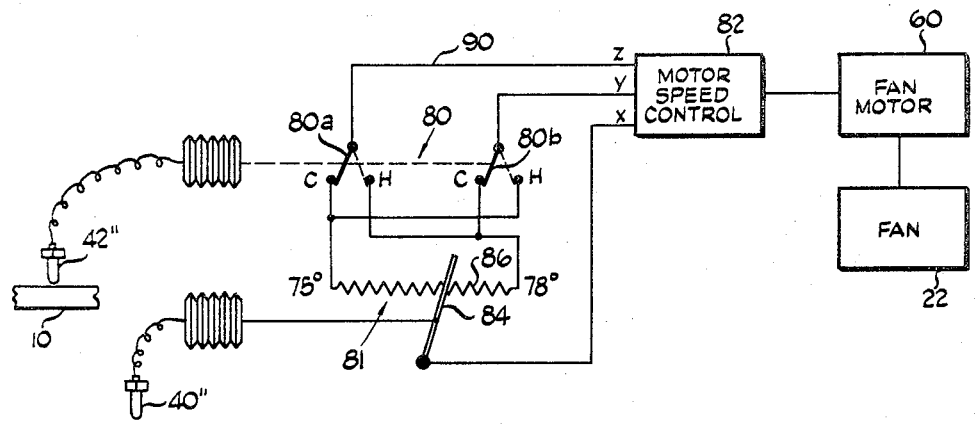
FIGURE 7 is a temperature control system for still another modification of the invention.

Referring now to FIGURE 1, the main water supply and return conduit 10 constitutes the major portion of a closed circuit conduit system including a supply riser 10a and a return riser 10b. Conduit 10 interconnects a conventional liquid chiller 12, a heater or boiler 14, and a plurality of room air conditioning units 16, which are respectively located in zones A, B, and C to be conditioned. The outlet line 13 from the chiller 12 and the outlet line 15 from the water heater 14 are both connected to a three-way valve 18 which selectively supplies cold or hot water to the inlet side of a liquid pump 20 by way of line 21. Valve 18 is controlled by a timer 19 in a manner which will be described in more detail below. It should be understood that the room units and zones illustrated in FIGURE 1 are merely representative of a large number of such units and zones in a typical multi-room installation.

The room air conditioning units 16 each include a fan 22 or other suitable air circulating means and a heat exchanger 24 which is supplied with water from conduit 10 through individual inlet lines 25. The water leaving the heat exchangers 24 is returned to conduit 10 through individual outlet lines 27.

In one embodiment of the invention, the inlet and outlet lines associated with the heat exchangers 24 in room units 16 are interconnected with conduit 10 by so-called Mono-Flow T-fittings (manufactured by Bell and Gosset Co.) The inlet fittings 28 (FIGURE 2) and the outlet fittings 30 (FIGURE 3) are constructed so that they divert a portion of the water flowing through line 10 to the heat exchangers by means of cone shaped baffles 32, 34 respectively. The outlet T-fittings 30 (FIGURE 3) are arranged so that baffle 34 restricts the flow of water through line 10, thereby increasing its velocity and inducing flow through the outlet line 27 and heat exchanger 24. The inlet fitting 28 is arranged so that the baffle 32 scoops a portion of the fluid passing through line 10, thereby facilitating flow into the inlet line 25.

Each of the inlet lines 25 includes a valve 36 actuated by a control 38 in response to: (1) the temperature of the air in the zones to be conditioned as sensed by temperature responsive bulbs 40 (or other suitable means); and (2) the temperature of water available to the room unit heat exchangers as sensed by temperature responsive bulbs 42 (or other suitable means) preferably located upstream from the inlet connection 28. When any of the bulbs 40 senses a temperature above the desired temperature level thereby calling for cooling, valves 36 will open only if cold water is circulating through conduit 10; and, if bulbs 40 sense a temperature below the desired temperature level, thereby calling for heating, valves 36 will open only if hot water is circulating through conduit 10.

The valve control 38 for room units 16 may be constructed in the manner shown in FIGURE 4. Two SPDT switches 44 and 46 are actuated by bulbs 40 and 42 respectively. Switch 44 is movable between contact $c$ (corresponding to a demand for cooling and closed at approximately 74° F.) and contact $h$ (corresponding to a demand for heating and closed at approximately 73° F.). Switch 46 is movable between a contact $c'$ (closed below 65° F. and indicating that water in 10 is available for cooling) and contact $h'$ (closed above 80° F. and indicating that hot water is available for heating). A circuit including switches 44, 46, a power supply 48, conductors 50, 51, 52, and solenoid valve actuator 54 is provided such that the valve 36 is open only when the $c$ and $c'$ contacts are closed; or alternatively, when the $h$ and $h'$ contacts are closed. In the solid-line position illustrated, hot water is flowing in conduit 10 so that switch arm of switch 46 completes a circuit through contact $h'$. The temperature within the room is such that it is calling for heating from the room air conditioning units so that the switch arm on switch 44 is closing the $h$ contact. Since contacts $h$ and $h'$ are connected by conductor 51 and contacts $c$ and $c'$ are connected by conductor 52, the circuit between the two switches is closed. Therefore, the solenoid 54 is energized to open the valve.

If more accurate temperature control is desired, it is possible to combine the valve control shown in FIGURE 4 with means for varying the speed of the fan 22. Such a control scheme is shown in FIGURE 5, it being understood that the same valve control of FIGURE 4, or its equivalent, is also employed in such a system. The fan motor 60 is under the control of a motor speed controller 62, which is preferably of the solid state type adapted to vary the power supplied to the motor in response to a control signal, usually a variable resistance biasing an SCR circuit. As shown, the signal to controller 62 is produced by two thermistors coupled in series and located in thermal relation with conduit 10. Thermistor 64 is of the type having a relatively stable resistance above about 65° F. but increasing as its temperature falls below 65° F. Thermistor 66 is of the type having a constant resistance below about 75° F., but increasing as its temperature rises above this level. The combined resistance of thermistors 64 and 66 will be at a minimum when the temperature of water flowing through line 10 is between 65° F. and 75° F.; but the resistance will increase in some proportional relation when the water temperature goes above or below this range. The motor speed control 62 therefore, produces a corresponding increase in the fan speed as the water available to the room unit heat exchanger gets colder or hotter.

Another embodiment of one of the room air conditioning units (and controls therefor) is illustrated in FIGURE 6. Instead of employing a valve and Mono-Flow fittings to control the flow of water from conduit 10, the inlet line 25 is provided with a small circulating pump 70, preferably of the type known as a March model MDX-35 (March Mfg. Co., Skokie, Ill.) which includes a completely enclosed, magnetic rotor 71 driven by motor 72 through an external rotating magnet 73.

A control 38' includes a first temperature sensing bulb 42' located on the main supply line 10 and a second bulb 40' in the incoming air stream on the inlet side of fan 22. The circuitry for control 38' is the same as that for control 38 shown in FIGURE 4, except that instead of controlling the energization of solenoid valve actuator 54, the electric motor 72 is connected so that the pump is operated when: (1) heating is called for and hot water is flowing in conduit 10; or (2) when cooling is called for and cold water is flowing in conduit 10. If desired, a fan speed control such as described above in connection with FIGURE 5, may be used in combination with the circulating pump water flow control.

In some installations, it may be desirable to omit the flow control valves or circulating pumps discussed above and simply use a fan speed control while allowing the water to circulate at all times through the heat exchange coils in room units 16. A control of this type is illustrated in FIGURE 7.

In this system, the bulb 42" sensing the water temperature in conduit 10 controls a DPDT switch 80 which reverses the directional sense of the air temperature sensing bulb 40". Bulb 40" is coupled to a potentiometer 81 which produces a control signal for the motor speed control 82. The motor control 82 is connected so that it will vary the speed of fan motor 60 driving fan 22 as the resistance ratio between terminals $x$ and $y$ and $x$ and $z$ is varied. Bulb 40" moves a slider 84 across a resistance 86 having limit positions at each end which correspond to about 75° F. and 78° F., respectively. If cold water is flowing in conduit 10, the switch arms 80a and 80b in switch 80 will be in contact with the $c$—$c$ contacts. If cooling is called for, the slider 84 will move from left to right, thereby increasing the resistance in the circuit between terminals $x$ and $z$ relative to the resistance between terminals $x$ and $y$. If hot water begins to flow in conduit 10, switch 80 is repositioned to move switch arms 80a and 80b to the $h$—$h$ contacts. This will invert the resistance ratio and reduce the fan speed to a low value or turn it off. If heating is then called for, the slider will move from right to left thus increasing the resistance between terminals $x$ and $z$ relative to the resistance between terminals $x$ and $y$ to increase fan speed.

Referring back to FIGURE 1, the flow control for water supplied to the room units will now be described. The water returning from all the room units interconnected with conduit 10 is directed through return riser 10b to a three-way valve 100 which is adapted to selectively feed either a line 101 connected to the water chiller inlet line 103 or line 105 which is connected to the heater inlet line 107. A valve actuating control 102 is responsive to the temperature of returning fluid as sensed upstream from the valve by temperature responsive bulb 104 and selectively directs the returning water to the heater 14 or chiller 12 depending on its temperature. If the returning water is below approximately 70°, the valve is open to line 101 and if it is above 70°, the valve is moved to a position interconnecting return riser 10b and line 105.

In order to economize on the operation when the water supply is changed from hot water to cold water or vice versa, two reservoir tanks 110 and 112 are provided. Cold water reservoir 110 is interconnected to the chiller inlet line and the hot water reservoir 112 is connected to the heater inlet line 107. A pressure equalizing line 111 interconnects the upper portion of the two reservoirs.

The cycling of the system to alternately supply hot and cold water to the room units is under the operation of a timing mechanism 19 which actuates the three-way supply valve 18 on the inlet side of the pump. Valve 18 is controlled on a schedule such that if the heating loads are above some predetermined level (approximately 60% of the maximum load for the entire building), the three-way valve is positioned so that it will circulate heated fluid from heater 14 to all of the room units. If the cooling loads are above some predetermined level (approximately 75% of the maximum load for the entire building), valve 18 will be positioned to interconnect lines 13 and 21 so as to continuously circulate chilled fluid from chiller 12. At intermediate load conditions, valve 18 is alternately cycled by timer 19 to first circulate chilled water and then hot water for predetermined intervals. Preferably, the ratio of the time hot water is circulated to the time cold water is circulated is dependent on the relative heating to cooling needs. This may be determined by sensing the relative temperature drop (or rise) through the entire system as measured by sensing the temperatures of the water supplied to the units at 114 and the water returned from the units at 116. This may be done automatically by a suitable cycling programmer, or manually by the operator or building engineer.

*Operation*

When conditions are such that cooling loads are not expected to exist in any part of the building, valve 18 is set to continuously supply hot water from heater 14 to all room units 16 via line 15, valve 18, line 21, pump 20, and supply riser 10a. Since the returning water is above room temperature, valve 100 is positioned by control 102 to return the water back to the heater through lines 105 and 107. The water in the reservoir 112 will be at a relatively low level while the water in reservoir 110 will be at a maximum level.

As conditions change to require both heating and cooling in separate locations, timer 19 repositions valve 18 to cut off the supply of hot water and begin circulating cold water through chiller 12. Initially, water will begin to flow from the reservoir 110 through line 103, the chilled water coil in the chiller 12, line 13, valve 18, pump 20, and conduit 10. Since there is a considerable amount of hot water still remaining in the lines, for the first few minutes after changeover, the controller for the three-way water return valve 100 will still be set to return water to the heater. Since the outlet line from the heater is shut off, the returning hot water will be supplied to the reservoir 112 as the cold water reservoir empties. As soon as cold water starts to return to valve 100, the valve is repositioned to cut off flow to the hot water reservoir and direct it through lines 101 and 103 to the chiller. At this time, the cold water reservoir is substantially empty.

Depending on the relative demand for heating or cooling, this operation is cycled on an established basis to alternate the flow of hot and cold water, approximately 1–6 times per hour so that each of the room air conditioning units is supplied with water of usable temperature to maintain the desired local conditions whether they be heating or cooling. When heating is no longer required in any portion of the building, valve 18 supplies chilled water continuously from the chiller 12 through line 13, valve 18, pump 20, conduit 10, line 101 and line 103. At this time, all of the hot water will be stored in reservoir 112 and the cold water reservoir will be empty. Line 111 interconnects the tops of both of the reservoir tanks so that as one fills, the other one empties. The space above the fluid may be filled with either air or an inert gas such as nitrogen or Freon.

Figure 8:
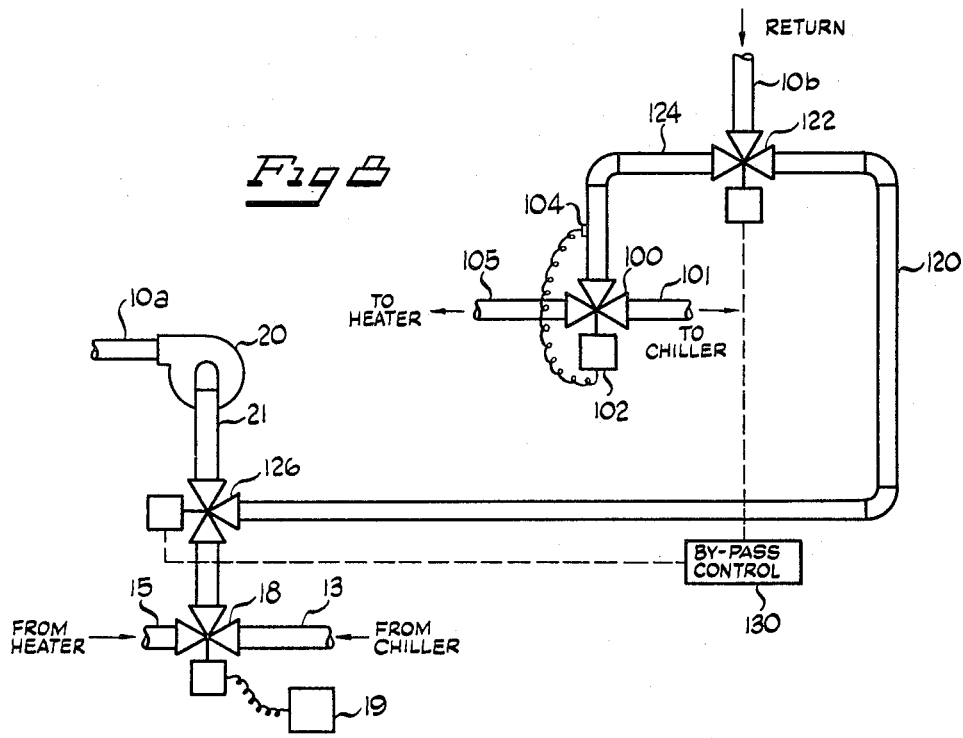
FIGURE 8 is a partial schematic illustration of a modified circulation system.

Under some applications of the invention, particularly in smaller installations where the volume of water in the circuit is relatively small, it may be desirable to allow the system to bypass the heater and chiller for a period between changeover to gradually bring the temperature of the water circulated to some intermediate temperature level. A system for bypassing the water around the heater and chiller is shown in FIGURE 8. A bypass line 120 is connected to a three-way valve 122 into which the returning water flows from return riser 10b and a section of conduit 124 leading to the three-way water return valve 100. The line 21 interconnecting three-way water supply valve 18 with pump 20 contains a three-way valve 126, the position of which is co-ordinated with the bypass valve 122. Assuming the water is being supplied at about 120° F. and returning at 100° F., it is possible to let the fluid circulate through the room units demanding heating while bypassing the heater for a period of time long enough to let the returning water temperature drop to about 75°. The system can then be switched over to begin circulation of the water through the chilled water coil in chiller 12. The controller 130 for valves 122 and 126 may be of any suitable type which is adapted to actuate both such valves simultaneously. When either the chiller or the heater is in operation, valve 122 is positioned to interconnect the return riser 10b with line 124 while valve 126 is positioned to pass fluid directly from valve 18 to the inlet side of pump 20. During the changeover cycle, valve 122 is positioned to interconnect return riser 10b with bypass line 120; and valve 126 is positioned to interconnect bypass line 120 with line 21 leading to the pump inlet. The controller may be manually operated or automatically timed in accordance with a predetermined schedule, depending on existing conditions.

The various forms of the invention have been described with respect to systems using fan-coil room units; but it is apparent that conventional induction units, such as described, for example, in U.S. Patent 2,783,979 (R. D. Blum; Mar. 5, 1957), may be substituted. In the modifications wherein the fan motor speed is varied, the equivalent induction units could be provided with air flow dampers to reduce the flow of air induced through the heat exchange coils.

In referring to the room air conditioning units as fan coil or induction units, it should be understood that such units are not to be restricted to a floor type unit with vertical air discharge. Such units may also be of the horizontal type suspended in ceiling areas and arranged to supply air through suitable ducts. They may also supply more than one room within a particular zone by having branch ducts opening into different rooms with a single heat exchange coil positioned upstream from the outlets.

While this invention has been described in connection with certain specific embodiments thereof, it is to be understood that this is by way of illustration and not by way of limitation; and the scope of the appended claims should be construed as broadly as the prior art will permit.

I claim:
1. A multi-room air conditioning system comprising:
 (A) a plurality of room air conditioning units located in a plurality of zones subjected to varying thermal loads, each said conditioning unit including

(1) a liquid to air heat exchanger and
(2) air circulating means for circulating room air over said heat exchanger;
(B) a heater adapted to heat a liquid heat exchange medium;
(C) a chiller connected in parallel with said heater adapted to cool a liquid heat exchange medium;
(D) a closed circuit conduit system interconnecting said room units, said heater and said chiller, said system including
   (1) a main conduit,
   (2) individual inlet conduits connected between said main conduit and the inlet side of each of said heat exchangers in said room unit, and
   (3) individual return conduits connected between said main conduit and the outlet side of said heat exchangers;
(E) temperature control means associated with each of said room units, said control means being operative to effect heat transfer between the circulating heat exchange medium and the air in said zones only upon a demand for cooling when chilled medium is available and upon a demand for heating when heating medium is available; and
(F) means for alternately circulating heater and chilled medium for predetermined intervals to said room air conditioning units from said heater and said chiller respectively when certain of said zones require heating and others require cooling.

2. A system as defined in claim 1 wherein said temperature control means includes
(A) valve means controlling the flow of the heat exchange medium being circulated through said main conduit through said heat exchanger; and
(B) actuating means for said valve means including temperature responsive means sensing
   (1) the temperature of the air circulating in said zone, and
   (2) the temperature of water available to said heat exchanger.

3. A system as defined in claim 2 including
(A) means for varying the flow of room air over said heat exchangers in response to the temperature of the heat exchange medium being circulated through said main conduit.

4. A system as defined in claim 1 including a circulating pump in the conduit system between the inlet and outlet connections of said heat exchanger with said main conduit, said temperature control means being operative to energize said pump upon a demand for cooling when cold water is available and upon a demand for heating when hot water is available.

5. A system as defined in claim 1 including
(A) a first reservoir for the storage of said heated medium;
(B) a second reservoir for the storage of said chilled medium; and
(C) means for selectively returning heated medium to said first reservoir and chilled medium to said second reservoir after initiation of a changeover from heating to cooling, or vice versa.

6. A system as defined in claim 1 wherein said temp rature control means includes
(A) control mechanism for varying the speed of said air circulating means in response to
   (1) the temperature of heat exchange medium available to said room air conditioning units, and
   (2) the temperature of air in said zone, said control mechanism including
   (3) means for reversing the sense of a change in room air temperature to increase the speed of said air circulating means when heating is required and heated medium is available and when cooling is required and chilled medium is available, said means being operable to reduce the speed of said air circulating means when cooling is required and heated medium is available and when heating is required and chilled medium is available.

7. A system as defined in claim 1 including means for bypassing said heat exchange medium around said heater and said chiller for a predetermined time interval between the initiation of a changeover from circulating heated medium to circulating chilled medium, or vice versa, to permit the circulating heat exchange medium to be brought to a temperature level which is intermediate the normal temperature of heated and chilled medium supplid to said room units.

8. A method of air conditioning a multi-room building comprising the steps of
(A) altrnatly circulating a heated, liquid heat exchange medium and a chilled, liquid heat exchange medium to a plurality of room air conditioning units located in a plurality of zones to be conditioned;
(B) supplying said heated, liquid heat exchange medium to said conditioning units in a given zone requiring heating only when said heated medium is being circulated, while bypassing said heated liquid heat exchange medium around the conditioning units in zones requiring cooling; and
(C) supplying said chilled, liquid heat exchange medium to said conditioning units in zones requiring cooling only when said chilled medium is being circulated, while bypassing said chilled medium around said conditioning units located in zones requiring heating.

9. A method as defined in claim 8 including the steps of
(A) returning the circulating medium to a heater when the temperature of said medium is above the average room temperature; and
(B) returning said circulating medium to a chiller when said medium is below the average room temperature.

10. A multi-room air conditioning system comprising:
(A) a plurality of room air conditioning units located in a plurality of zones subjected to varying thermal loads, each said conditioning unit including
   (1) a liquid to air heat exchanger and
   (2) means for circulating room air over said heat exchanger;
(B) a source of heated liquid heat exchange medium;
(C) a source of chilled liquid heat exchange medium;
(D) a conduit system interconnecting said room units and said sources of heated and chilled medium, said system including
   (1) a main conduit;
   (2) individual inlet conduits connected between said main conduit and the inlet side of each of said heat exchangers in said room unit; and
   (3) individual return conduits connected between said main conduit and the outlet side of said heat exchangers;
(E) temperature control means associated with each of said room units, said control means being operative to effect heat transfer between the circulating heat exchange medium and the air in said zones only upon a demand for cooling when chilled medium is available and upon a demand for heating and when heating medium is available; and
(F) means for alternately circulating heated and chilled medium for predetermined intervals to said room air conditioning units from said heated medium source and said chilled medium source respectively when certain of said zones require heating and others require cooling.

11. An air conditioning unit comprising:
(A) a liquid-to-air heat exchanger having liquid inlet and outlet sides;

(B) a main supply conduit through which a heated liquid heat exchange medium and a chilled liquid heat exchange medium are alternately circulated, said conduit being connected in parallel with said heat exchanger;

(C) control means for controlling the flow between said supply conduit and inlet side of said heat exchanger, said control means including (1) first temperature responsive means sensing the demand for heating and cooling of the ambient air; and (2) second temperature responsive means sensing the temperature of the heating medium available for supply to said heat exchange coil, said control means being operative to supply heated heat exchange medium to said heat exchanger only when heated medium is available in said supply conduit and there is a demand for heating, and to supply chilled medium to said heat exchanger only when chilled medium is available in said supply conduit and there is a demand for cooling.

References Cited

UNITED STATES PATENTS

| | | | |
|---|---|---|---|
| 2,492,757 | 12/1949 | Meek | 165—50 |
| 3,256,929 | 6/1966 | Carlson | 165—50 |

ROBERT A. O'LEARY, *Primary Examiner.*

CHARLES SUKALO, *Examiner.*

UNITED STATES PATENT OFFICE
CERTIFICATE OF CORRECTION

Patent No. 3,384,155                        May 21, 1968

Alwin B. Newton

It is certified that error appears in the above identified patent and that said Letters Patent are hereby corrected as shown below:

Column 7, line 25, "heater" should read -- heated --.

Signed and sealed this 14th day of October 1969.

(SEAL)
Attest:

Edward M. Fletcher, Jr.
Attesting Officer

WILLIAM E. SCHUYLER, JR.
Commissioner of Patents